United States Patent [19]

Taniguchi

[11] Patent Number: 4,561,535

[45] Date of Patent: Dec. 31, 1985

[54] APPARATUS FOR PLACING A BOARD INTO AN UPRIGHT STATE

[75] Inventor: Matsuyoshi Taniguchi, Shiga, Japan

[73] Assignee: Dainippon Screen Mfg. Co., Ltd., Kyoto, Japan

[21] Appl. No.: 581,072

[22] Filed: Feb. 17, 1984

[30] Foreign Application Priority Data

Jun. 4, 1983 [JP] Japan .................................. 58-99847

[51] Int. Cl.[4] ............................................. B65G 47/24
[52] U.S. Cl. ....................................... 198/406; 198/408
[58] Field of Search .............. 198/406, 409, 408, 489, 198/592, 472, 486; 414/225, 226, 783, 754; 406/77, 84, 87, 88, 89

[56] References Cited

U.S. PATENT DOCUMENTS 1,983,755 12/1934 Heichert .............................. 414/754
2,525,132 10/1950 Herts et al. .......................... 198/489
3,252,560 5/1966 Chamberlin ......................... 198/409
3,410,387 11/1968 Wennberg et al. ................. 198/409
4,123,049 10/1978 Jacobs ................................. 198/489

FOREIGN PATENT DOCUMENTS 1280750 10/1968 Fed. Rep. of Germany .
2410452 5/1975 Fed. Rep. of Germany .
0069186 6/1977 Japan ................................... 406/84
0286190 3/1928 United Kingdom ................ 198/27

Primary Examiner—Joseph E. Valenza
Assistant Examiner—Darrell G. Dayoan
Attorney, Agent, or Firm—Lowe King Price & Becker

[57] ABSTRACT

A board is held in fixed position on a board conveyer, and placed into an upright state with the board conveyer to position the upper or leading edge of the raised board always at a predetermined height.

5 Claims, 5 Drawing Figures

APPARATUS FOR PLACING A BOARD INTO AN UPRIGHT STATE

FIELD OF THE INVENTION

This invention relates to an apparatus for placing a board such as a printed circuit board or a metal board into an upright state to convey the board to a treatment solution such as a solder solution or an etching solution, particularly to such an apparatus in which a board conveyed in a flat state is put into an upright state to be conveyed to a treatment solution.

BACKGROUND OF THE INVENTION

Conventionally, to simplify manufacturing equipment, boards are conveyed that by belt or roller conveyers. The boards are immersed into a treatment solution usually by being conveyed by the conveyer through the solution. However, especially for a solder or etching solution, said kind of conveyer is hardly equipped in the solution because the solution has intense heat or corrosive action. So, the immersion process of a board into a treatment solution is usually done in a way as shown in FIG. 1, in which a board 2 is taken by a conveyance arm 1 and moved up and down in the solution. Therefore a system for putting a board into an upright state is necessary to bring the board conveyed in a flat state to a solution like a solder solution.

FIG. 2 shows a conventional system for performing the abovementioned process.

The system of FIG. 2 comprises a board stopper 5 equipped between conveyer belts 4 and 4', a board raiser 7 located just before the board stopper 5. When a board is conveyed by the belts 4 and 4' to the board stopper 5, a piston cylinder 6 pivots the board raiser 7 about pivot 8 through 90 degrees to put the board 2 from the belts 4 and 4' into an upright state. However, abovementioned conventional system doesn't fully match the system shown in FIG. 1 because of the following reason. That is, as the conveyance arm 1 grasps the trailing edge of the board 2 from the viewpoint of its ongoing direction, the conveyance arm 1 must be adjusted of its handling position (height) according to the length of the board 2 to be handled. Especially because of the development of the electronic industry, a wide variety of boards such as a printed circuit board are made, each of which is comparatively few on the other hand. So the above kind of adjustment procedure is done frequently, which is of course an obstacle to increased production efficiency and to the development of an automatic conveyance system.

SUMMARY OF THE INVENTION

To solve the above problem, the method of this invention is to provide a board raiser which does not require adjustment of a conveyance arm when boards of various length are conveyed to the board raiser in a flat state and grasped by the conveyance arm in an upright state.

The above and other objects and features of this invention can be appreciated more fully from the following detailed description when read with reference to the accompanying drawings.

PREFERRED EMBODIMENT OF THE INVENTION

Figure 3:
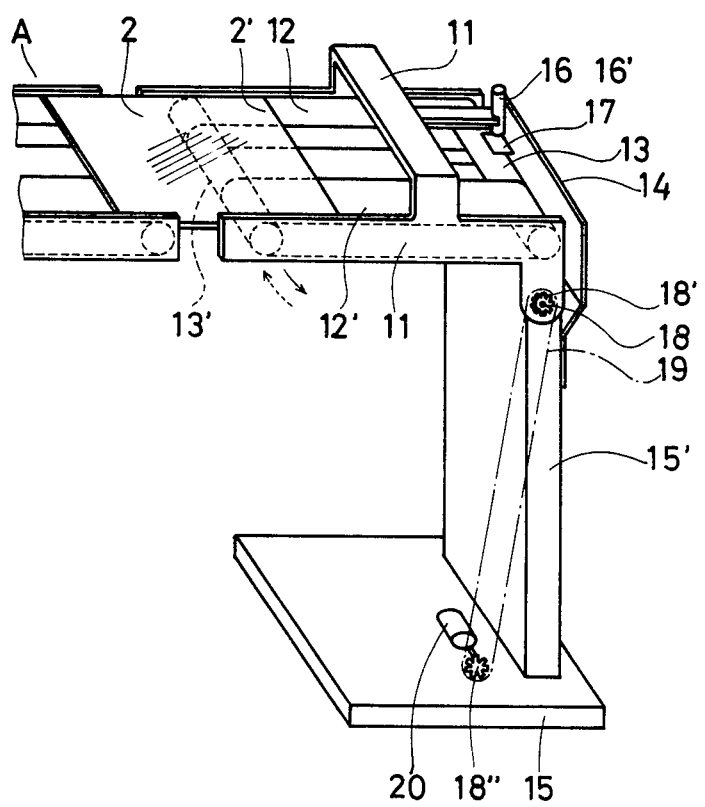
FIG. 3 shows an embodiment of this invention in which a board is conveyed to a conveyance rack for placing the board into an upright state.

In FIG. 3, a pillar 15' is attached perpendicular to a chasis 15, and a conveyance rack 11 is pivotally connected at 18 to the pillar 15'. The conveyance rack 11 comprises two rollers 13 and 13' and belts for conveying a board 2 being conveyed from a conveyer A in a flat state to a board stopper 14 as it is.

Figure 4:
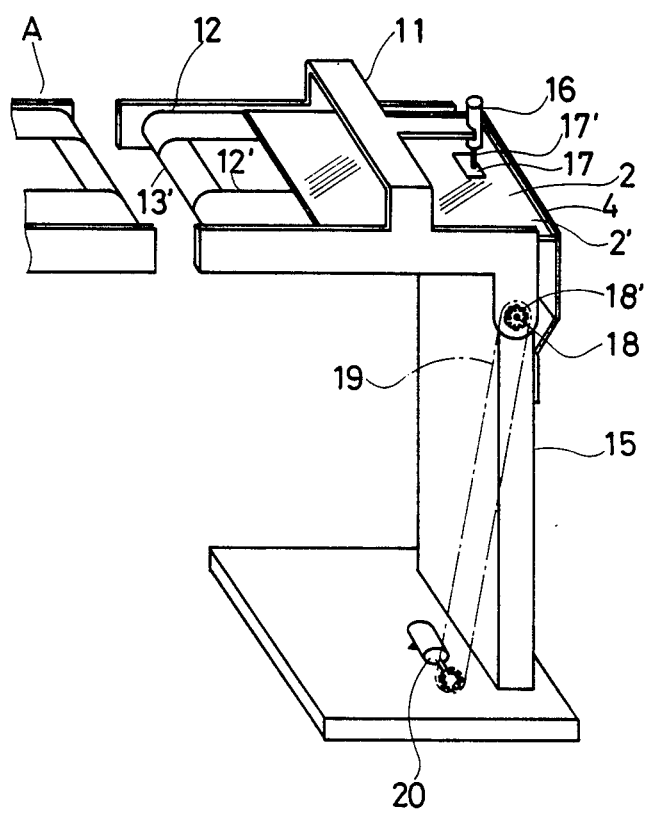
FIG. 4 shows the embodiment shown in FIG. 3 in which the board is conveyed to a board stopper.

The abovementioned belt conveyer can be replaced with a roller conveyer or an air conveyer. The board stopper 14 stops the board 2 in a predetermined location when the leading edge 2' of the board 2 contacts the board stopper. Above the roller 13, a piston cylinder 16 is attached on the conveyance rack 11. The piston cylinder 16 has a pressure rod 16' to which a pressure board 17 is attached. When a sensor (not shown) detects travel of the board 2 to the predetermined location, the piston cylinder 16 pushes the pressure board 17 down. Consequently the board 2 is held in place by the pressure of the pressure board 17 and belts 12 and 12' as shown in FIG. 4. Of course the piston cylinder can be equipped wherever it can perform its work, still the best place is the conveyance rack 11.

Incidentally, the board 2 can also be held in the determined place by a vacuum sucker.

Figure 5:
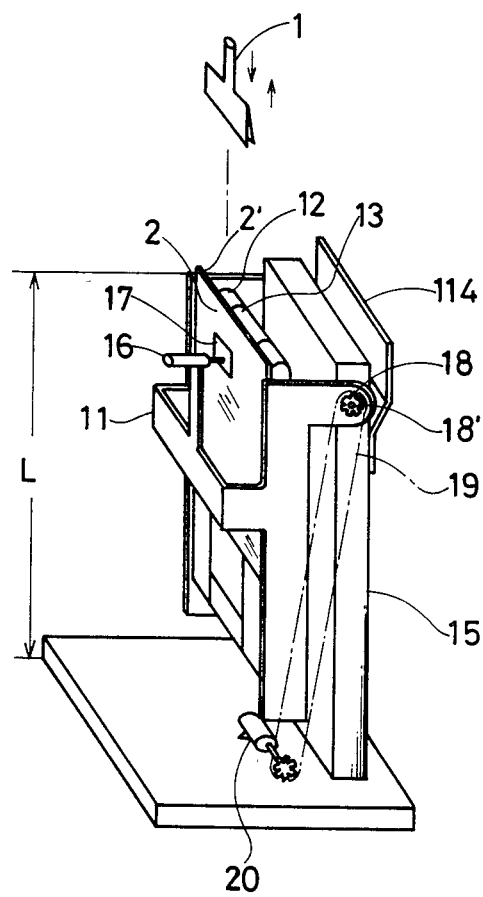
FIG. 5 shows the embodiment shown in FIG. 3 in which the board is put into an upright state.

The conveyance rack 11 revolves round pivot 18 through 90 degrees, as shown in solid and broken arrows in FIG. 3, by motor 20 equipped on the chassis 15 with a chain 19 and a pair of sprockets 18' and 18". The board 2 held in the determined place by the pressure board 17 and the belts 12 and 12' can be put into an upright state by revolving the conveyance rack by about 90 degrees to the direction of the solid arrow, where the leading edge 2' of the board 2 comes to a place of height (L) regardless of the length (1)' of the board 2 as shown in FIG. 5.

The conveyance rack 11 can be revolved to the direction of the solid arrow after an arbitrary interval, which can be determined electrically or mechanically according to the operation time for holding the board 2.

Figure 1:
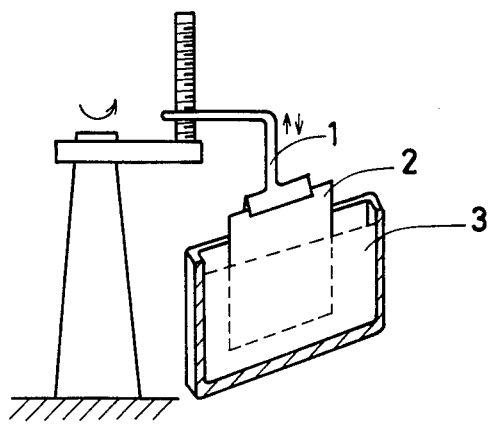
FIG. 1 shows a conveyance system of a board to a treatment solution in an upright state.
Figure 2:
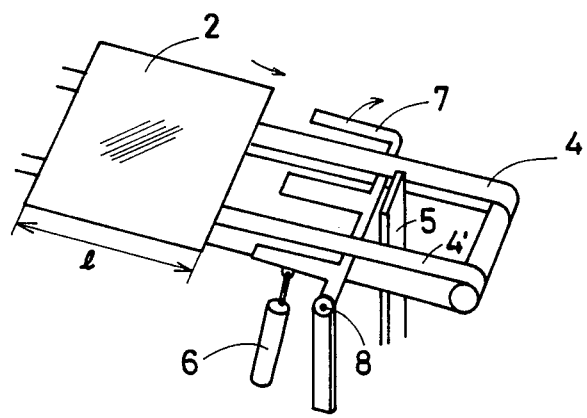
FIG. 2 shows a conventional apparatus for placing a board into an upright state.

The board 2 put into an upright state is taken to a treatment solution by the conveyance arm 1 as shown in FIG. 1, where the handling position (height) of the arm 1 can be fixed.

The conveyance rack 11 can be revolved in the direction of the broken arrow by motor 20 whenever after the board 2 is taken out from the conveyance rack 11.

Pivoting of the conveyance rack can also be attained with a piston cylinder, apart from using a motor as discussed above, as long as the leading edge 2' of the board 2 is kept at height (L). Incidentally, the conveyance rack must not necessarily be completely level. For example, it can be a smooth slide way instead of the belts 12 and 12', on which slide way the board 2 slides toward the board stopper by its own gravitation energy.

As is mentioned above, the system of this invention is capable of placing a board conveyed in a flat state into an upright state wherein the upper edge of the board is always made to be in a certain height in order to let a conveyance arm which takes the board to a treatment solution be free from any adjustment of handling position (height). Therefore, this kind of height-adjustment-free board conveyance system promotes efficiency of treating boards. Of course the system of this invention can be used for any flat conveyance system such as a belt, roller or air conveyance system, and is capable of handling printed circuit boards, metal boards or glass boards etc. as the boards for putting such boards into a treatment solution such as a solder, etching or cleaning solution.

I claim:

1. Apparatus for moving a board from a horizontal to an upright position, comprising:
   (a) conveyor means for conveying the board in a generally horizontal direction;
   (b) positioning means for contacting and positioning the leading edge of the board at a predetermined position as said board travels along the conveyor means;
   (c) holding means for holding the board on the conveyor means at the predetermined position;
   (d) means for moving the board held on the conveyor means into an upright position, wherein the leading edge of the board is directed upward; and
   (e) clamping means for clamping the leading edge of the board in the upright position, said clamping means being provided substantially above said leading edge of the board and movable in vertical directions, whereby when the board is transferred upright from the conveyor means to the clamping means, the leading edge of the board is clamped at the same elevational position independent of size or length of the board.

2. An apparatus claimed in claim 1 in which the board conveyance means is a belt conveyer.

3. An apparatus claimed in claim 1 in which the board conveyance means conveys the board in a flat state.

4. An apparatus claimed in claim 1 in which the board holding means is a pressure means for pressing the board against the board conveyance means.

5. An apparatus claimed in claim 1 in which the board raising means is motor power.

* * * * *